UNITED STATES PATENT OFFICE.

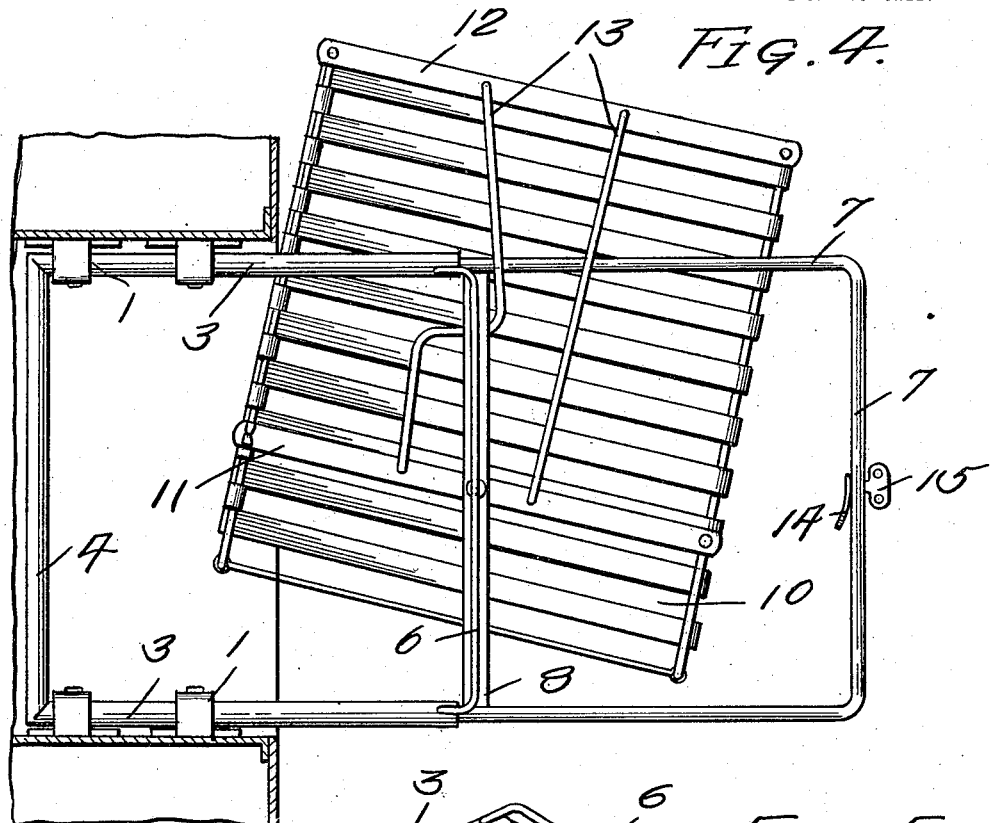

ANTHONY BOERNER, OF LYONS, NEBRASKA.

OVEN-GRATE.

1,179,396.  Specification of Letters Patent.  Patented Apr. 18, 1916.

Application filed February 8, 1915. Serial No. 6,846.

*To all whom it may concern:*

Be it known that I, ANTHONY BOERNER, a citizen of the United States, residing at Lyons, in the county of Burt, State of Nebraska, have invented certain new and useful Improvements in Oven-Grates; and I do hereby declare the following to be a full, clear, and exact description of the invention, such as will enable others skilled in the art to which it appertains to make and use the same.

This invention relates to an oven grate.

An object of the invention resides in the provision of a grate on which food stuffs may be supported within the oven.

A further object of the invention resides in so constructing the grate that it may be withdrawn from the oven in order that the food stuffs may be removed or inspected without making it necessary for the operator to get near the fire.

With these and other objects in view, such as will appear as the description progresses, my invention comprises the combination and arrangement of parts as set forth in and falling within the scope of the appended claim.

Figure 1:
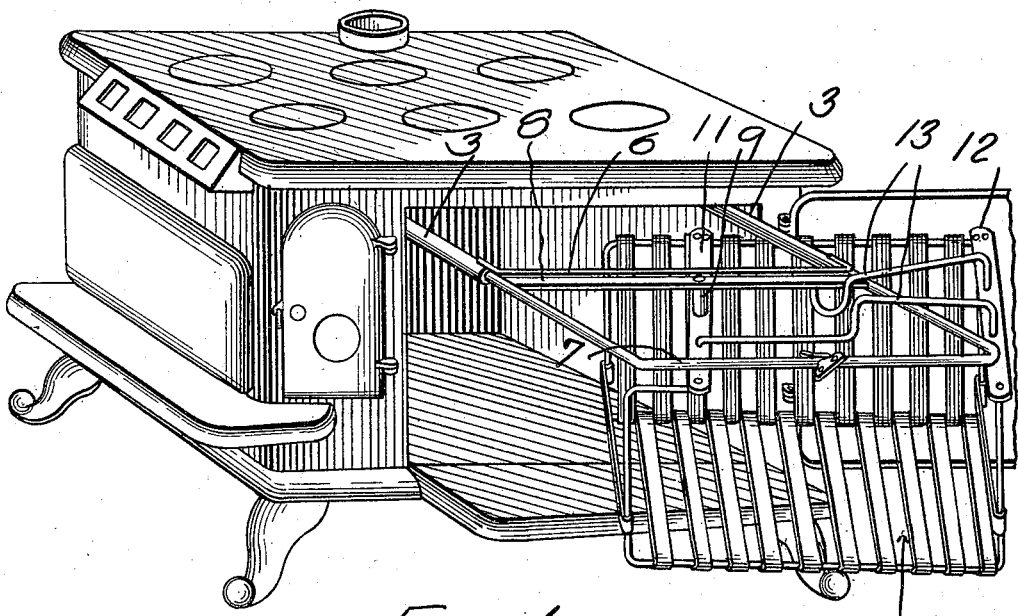
Figure 2:
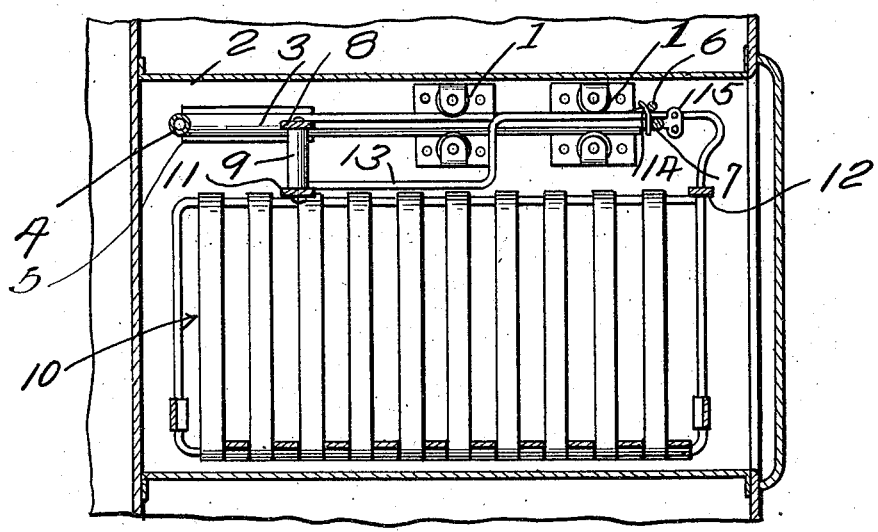

Referring to the drawing: Figure 1 is a perspective view of my device showing the grate withdrawn from the oven. Fig. 2 is a vertical sectional view, showing the manner of supporting the grate within the oven. Fig. 3 is a fragmental view showing the manner of mounting the grate in the supporting means. Fig. 4 is a fragmental plan view showing the grate out of the oven and swung around so that the food stuffs may be removed therefrom. Fig. 5 is a perspective view showing the latching mechanism. Fig. 6 is a detail of the supporting rollers.

Referring to the drawing wherein like parts are indicated by like characters throughout the several views: In the embodiment of my invention shown in the drawings I have provided a plurality of spaced pairs of rollers 1 secured to the opposite inner faces of the oven 2. Supported on these rollers 1 so as to be movable into or out of the oven is a U-shaped tubular supporting member 3 having a cross bar 4 at its rear end which contacts with the rollers and limits the outward movement of the member 3. When this supporting member 3 is located entirely within the oven the rear end thereof is supported by brackets 5.

Connecting the forward ends of the U-shaped member 3 is a rod 6. Slidably mounted in the tubular legs of this supporting member 3 is a U-shaped rod 7 extending in an opposite direction to the member 3 and having a cross bar 8 between the legs thereof, which cross bar is provided with a downwardly extending lug 9 to which is pivotally secured a depending grate 10, one side of which is entirely open as indicated in the drawing.

Secured to a cross bar 11 on the grate 10 and extending to a second cross bar 12 thereon are two arms 13 which bear against the rod 7 and support the forward end of the grate. When the rod 7 is telescoped within the U-shaped member 3 the rod 6 is in alinement with the cross bar 12 of the grate and in order that they may be maintained in alinement I have provided a latch 14 having an operating handle 15 thereon provided with two holes in which the prongs of a handle may be engaged to withdraw the grate from the oven.

During a baking operation the U-shaped member 3 and the grate are located entirely within the oven so that the door thereof may be closed. At this time the legs of the rod 7 are telescoped within the legs of the supporting member 3 and the rear end of this member rests upon the brackets 5, the rod 6 is at this time in alinement with the cross bar 12 and the latch 14 maintains the same in this position. When it is desired to withdraw the grate from the oven the handle is engaged with the holes in the latch 14 and the grate pulled outwardly. The first movement brings the supporting member outwardly until the cross bar 4 engages the supporting rollers at which time the latch member 14 may be disengaged from the rod 6 and a further pull will cause the rod 7 to be drawn out of the supporting member 3 and the grate out of the oven. The grate may then swing about the lug 9 as a pivot being supported in this movement by the arms 13 so that the open side of the grate will be exposed and access may be had to the grate.

From the foregoing description it will be seen that I have provided an oven grate by means of which food stuffs may be supported in the oven so that they can be readily withdrawn therefrom and inspected or removed without exposing the operator to the heat of the oven.

While I have illustrated and described a particular embodiment of my invention I have merely done so for the sake of convenience and I do not wish to be limited to that particular embodiment of my invention as it is obvious that numerous changes may be made within the details of construction thereof without in any manner departing from the spirit of the invention or exceeding the scope of the appended claim.

What I claim is:—

The combination with an oven, of a supporting member slidably mounted therein, a U-shaped rod telescopically mounted in said supporting member, a grate pivotally supported by said rod and having movement in a horizontal plane, means mounted on the grate and bearing on the said U-shaped rod for supporting the end of the grate upon its pivotal movement.

In testimony whereof, I affix my signature, in the presence of two witnesses.

ANTHONY BOERNER.

Witnesses:
W. S. NEWMYER,
D. E. LYON.

Copies of this patent may be obtained for five cents each, by addressing the "Commissioner of Patents, Washington, D. C."